US010671920B2

(12) United States Patent
Zuev et al.

(10) Patent No.: US 10,671,920 B2
(45) Date of Patent: Jun. 2, 2020

(54) GENERATIVE AUGMENTATION OF IMAGE DATA

(71) Applicant: ABBYY Production LLC, Moscow (RU)

(72) Inventors: Konstantin Zuev, Moscow (RU); Andrejs Sautins, Moscow (RU)

(73) Assignee: ABBYY Production LLC, Moscow (RU)

( * ) Notice: Subject to any disclaimer, the term of this patent is extended or adjusted under 35 U.S.C. 154(b) by 240 days.

(21) Appl. No.: 15/938,897

(22) Filed: Mar. 28, 2018

(65) Prior Publication Data
US 2019/0294961 A1    Sep. 26, 2019

(30) Foreign Application Priority Data

Mar. 23, 2018   (RU) .................................. 2018110382

(51) Int. Cl.
*G06T 5/00* (2006.01)
*G06N 3/08* (2006.01)

(52) U.S. Cl.
CPC .............. *G06N 3/08* (2013.01); *G06T 5/002* (2013.01); *G06T 2207/20081* (2013.01)

(58) Field of Classification Search
CPC .......... G06N 3/08; G06N 3/084; G06T 5/002; G06T 2207/20081; G06T 2207/20084; G06K 9/00335
USPC ....................................................... 382/157
See application file for complete search history.

(56) References Cited

U.S. PATENT DOCUMENTS

| 9,785,855 B2 * | 10/2017 | Gordo Soldevila ..... G06K 9/66 |
| 10,445,569 B1 * | 10/2019 | Lin ........................... G06T 7/60 |
| 2014/0201126 A1 | 7/2014 | Zadeh et al. |
| 2015/0379422 A1 | 12/2015 | Chandler |
| 2018/0005343 A1 * | 1/2018 | Rhoads ..................... G06T 7/74 |
| 2019/0026538 A1 * | 1/2019 | Wang ........................ G06T 7/20 |

(Continued)

FOREIGN PATENT DOCUMENTS

WO        2017031356 A1    2/2017

OTHER PUBLICATIONS

Gulcan Can et al., "Evaluating Shape Representations for Maya Glyph Classification", Journal on Computing and Cultural Heritage (JOCCH), 2016 Article, 2 pages.

(Continued)

*Primary Examiner* — Ali Bayat
(74) *Attorney, Agent, or Firm* — Lowenstein Sandler LLP

(57) ABSTRACT

Systems and methods to receive one or more first images associated with a training set of images to train a machine learning model; provide the one or more first images as a first input to a first set of layers of computational units, wherein the first set of layers utilizes image filters; provide a first output of the first set of layers of computational units as a second input to a second layer of the computational units, wherein the second layer utilizes random parameter sets for computations; obtain distortion parameters from the second layer of the computational units; generate one or more second images comprising a representation of the one or more first images modified with the distortion parameters; obtain, as a third output, the one or more second images; and add the one or more second images to the training set of images to train the machine learning model.

20 Claims, 11 Drawing Sheets

(56) References Cited

U.S. PATENT DOCUMENTS

2019/0043003 A1* 2/2019 Fisher .................. G06K 9/6274
2019/0258251 A1* 8/2019 Ditty .................... G05D 1/0088

OTHER PUBLICATIONS

Denise Klep et al., "Data augmentation of a handwritten character dataset for a Convolutional Neural Network and Integration into a Bayesian Linear Framework", Radboud University, Nijmegen, Bachelor Thesis, Artificial Intelligence, Jun. 3, 2016, 26 pages.

Yunchen Pu et al., "Variational Autoencoder for Deep Learning of Images, Labels and Captions", Dept. of Electrical and Computer Engineering, Duke University, 29th Conference on Neural Information Processing Systems (NIPS 2016), Barcelona, Spain, 13 pages.

Charlie Tsai, "Recognizing Handwritten Japanese Characters Using Deep Convolutional Neural Networks", Dept. of Chemical Engineering, Stanford University, Mar. 2016, 7 pages.

Adam Coates, "Text Detection and Character Recognition in Scene Images with Unsupervised Feature Learning", Computer Science Dept., Stanford University, Jun. 2011, 6 pages.

Ira Korshunova et al., "Classifying plankton with deep neural networks", National Data Science Bowl, Ghent University, Belgium, Mar. 17, 2015, 19 pages.

Soren Goyal et al., "Object Recognition Using Deep Neural Networks: A Survey", Pace University, Dec. 2014, 7 pages.

Twan Cuijpers, "Recognizing Text in the Wild", Bachelor Thesis Computer Science, Radboud University, Apr. 2017, 28 pages.

Maxim Tatarchenko et al., "Multi-view 3D Models from Single Images with a Convolutional Network", Dept. of Computer Science, University of Frieburg, Jul. 2016, 20 pages.

TJ Torres, "Deep Style: Inferring the Unknown to Predict the Future of Fashion", San Francisco, CA, Sep. 17, 2015, 10 pages.

Terrance Devries et al., "Dataset Augmentation in Feature Space", School of Engineering, University of Guelph, Canada, 12 pages.

Jason Wang et al., "The Effectiveness of Data Augmentation in Image Classification using Deep Learning", Stanford University, 2017, 8 pages.

\* cited by examiner

Bias initial
710

[0. 0. 0. 0. 0. 0. 0. 0. 0. 0. 0. 0. 0. 0. 0. 0. 0. 0. 0. 0. 0. 0. 0. 0. 0. 0. 0. 0. 0. 0.]

Bias trained
720

GENERATIVE AUGMENTATION OF IMAGE DATA

REFERENCE TO RELATED APPLICATIONS

The present application claims the benefit of priority under 35 U.S.C. § 119 to Russian Patent Application No. 2018110382 filed Mar. 23, 2018, the disclosure of which is incorporated herein by reference in its entirety for all purposes.

TECHNICAL FIELD

The present disclosure is generally related to image processing, and is more specifically related to systems and methods for generating random distortions and augmenting image data, including, for use in machine learning models training.

BACKGROUND

Machine learning enables computer systems to learn to perform tasks from observational data. Machine learning algorithms may enable the computer systems to learn without being explicitly programmed. Machine learning approaches may include, but not limited to, neural networks, decision tree learning, deep learning, etc. A machine learning model, such as a neural network, may be used in solutions related to image recognition, including optical character recognition. The observational data in the case of image recognition may be plurality of images. A neural network may thus be provided with training sets of images from which the neural network can learn image recognition.

SUMMARY OF THE DISCLOSURE

In accordance with one or more aspects of the present disclosure, an example method for generating image augmentation may comprise: receiving, by a processing device, one or more first images associated with a training set of images to train a machine learning model in training; providing, by the processing device, the one or more first images as a first input to a first set of layers of computational units, wherein the first set of layers utilizes image filters; providing a first output of the first set of layers of computational units as a second input to a second layer of the computational units, wherein the second layer utilizes random parameter sets for computations; obtaining distortion parameters from the second layer of the computational units; generating one or more second images based on the one or more first images and the distortion parameters; obtaining, as a third output, the one or more second images; and adding the one or more second images to the training set of images to train the machine learning model.

In accordance with one or more aspects of the present disclosure, an example system for generating image augmentation may comprise: a memory; and a processor, coupled to the memory, the processor to: receive one or more first images associated with a training set of images to train a machine learning model in training; provide the one or more first images as a first input to a first set of layers of computational units, wherein the first set of layers utilizes image filters; provide a first output of the first set of layers of computational units as a second input to a second layer of the computational units, wherein the second layer utilizes random parameter sets for computations; obtain distortion parameters from the second layer of the computational units; provide a second output of the second layer of the computational units as a third input to a third set of layers of the computational units; provide a third output of the third set of layers of the computational units as one or more second images, the third output being based on the one or more first images and the distortion parameters; and add the one or more second images to the training set of images to train the machine learning model.

In accordance with one or more aspects of the present disclosure, an example computer-readable non-transitory storage medium may comprise executable instructions that, when executed by a processing device, cause the processing device to: receive one or more first images associated with a training set of images to train a machine learning model in training; provide the one or more first images as a first input to a first set of layers of computational units, wherein the first set of layers utilizes image filters; provide a first output of the first set of layers of computational units as a second input to a second layer of the computational units, wherein the second layer utilizes random parameter sets for computations; obtain distortion parameters from the second layer of the computational units; generate one or more second images comprising a representation of the one or more first images modified with the distortion parameters; obtain, as a third output, the one or more second images; and add the one or more second images to the training set of images to train the machine learning model.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 7 illustrates an example matrix, in accordance with one or more aspects of the present disclosure.

DETAILED DESCRIPTION

Figure 1:
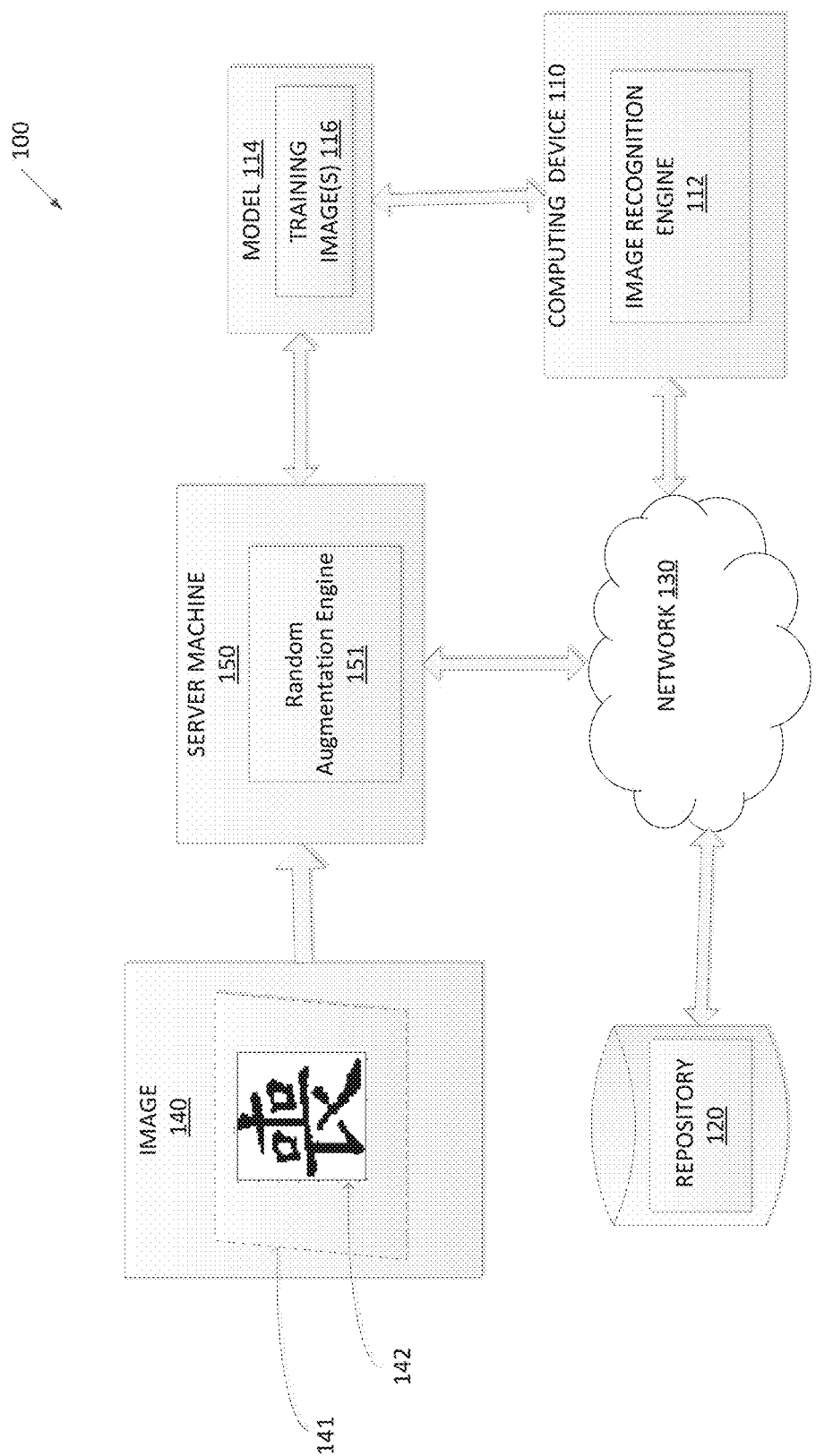
FIG. 1 depicts a high-level component diagram of an example system architecture, in accordance with one or more aspects of the present disclosure.

Described herein are methods and systems for generative augmentation of image data for training set of images for use in a machine learning model.

"Computer system" herein shall refer to a data processing device having a general purpose processor, a memory, and at least one communication interface. Examples of computer systems that may employ the methods described herein include, without limitation, desktop computers, notebook computers, tablet computers, and smart phones.

Machine learning models may be used to perform image recognition, including optical character recognition (OCR), pattern recognition, photo recognition, facial recognition, etc. As an example, a neural network may be used as a machine learning model for image recognition. A machine learning model may be provided with sample images as training sets of images which the machine learning model can learn from. The larger and varied the training sample, the better it is possible to train a machine learning model. However, providing a machine learning model with varied and adequate number of sample training images is often a difficult task due to the limited availability of such images. Additionally, creating initial sets of training samples is an exorbitant task because during the initial stage, there may only be a small number of sample images available, which may not be enough to train the model.

An effort to produce a larger number of training samples may be made using augmentation techniques that can create artificial sample images from an original, existing image. The techniques may involve creating alterations or distortions to an original image to produce a slightly different version of the original image. In this manner, multiple training samples with distortions may be produced from each original image. Traditional systems involve applying numerous tasks and/or sequential actions to each original image for augmenting it for obtaining one training sample of one distortion type. This process is resource intensive and error prone. Using traditional methods, a restricted and limited number of augmented images can be obtained (e.g., one augmented image for one original image). Also, in conventional systems, the techniques may involve applying a particular type of distortion on each available original image. The particular type of distortion may be based on specified rules or restrictions. Thus, for example, when augmenting several original images with similar characteristics, such as, images with different Chinese-Japanese-Korean ("CJK") symbols, the distortions applied to each of the original images may result in similar distortions and as a result cause inaccuracies and difficulties in terms of learning the model. Traditional methods do not provide for random distortions that are close to naturally distorted images and without restriction to the number of synthetically (e.g., artificially) distorted images obtained from a single original image. When images are not close to naturally distorted images, the machine learning using the images may lead to inaccuracies and ineffective learning for recognizing other naturally distorted images. Thus, traditional techniques may lead to inefficiency, inaccuracy, error proneness, slowness and labor intensity.

The systems and methods herein provide improvements to an image augmentation system. Image augmentation adds value to base image data by appending additional information, thereby increasing the size of an image data set. An autoencoder (AE) may be used to augment (e.g., increase, expand, etc.) image data. An autoencoder is a direct distribution (e.g., learns to mimic the data distribution of the input data) machine learning model (e.g., neural network) that restores an input signal to the output. The neural network may include an input layer, an output layer, and one or more hidden layers, with the output layer reconstructing the inputs. Autoencoders are designed such that they cannot precisely copy the input at the output layer. The input signal in the autoencoder is reconstructed with some errors and the neural network minimizes the errors by learning to select the most important characters. One type of autoencoder includes variational autoencoders ("VAE"), which may be used for learning latent representations (e.g., latent variables, which are inferred through mathematical models from observed variables). In some examples, autoencoders may be used for learning generative models of data. A generative model is a model for generating all values for a phenomenon, both those that can be observed in the world and target variables that can only be computed from those observed. Some augmentation systems may utilize convolutional neural networks. Convolution may refer to a process of adding each element of an image to its local neighbors, being processed (e.g., multiplied) by specified numbers. Convolutional neural networks ("CNN") may consist of layers of computational units to hierarchically process visual data, and may feed forward the results of one layer to another layer, extracting a certain feature from input images. Each of the layers may be referred to as a convolutional layer or convolution layer.

The systems and methods described herein represent significant improvements to image augmentation systems by imposing random distortions to images. The systems described herein use randomized parameter sets for image augmentation. The technology provides for effectively creating useful synthetic training dataset for a machine learning model. The systems herein provide for using a single original image and superimpose nearly natural random distortions on the original image every time when the original image passes through the improved augmentation system and do so without any restriction on the number of times the original image may be augmented. It also provides for regulation of the roughness or coarseness of distortions applied on the original image.

In one implementation, the systems and methods herein provide for an improved layer of a convolutional neural network. The improved layer may be a new layer that utilizes random parameter sets. The improved layer may be referred to as the "random convolutional layer," "random layer," "variational convolutional layer," and/or "variational layer" throughout the disclosure. In an example, one or more images may be received by an input layer of a convolutional neural network (CNN). The input layer may feed forward the one or more images to another set of layers of a CNN, which may be two dimensional layers with different number of image filters and channels. The set of layers may include iterative filtering of the one or more images, passing the images from one layer to the next layer within the set of layers. The filtered images may be fed to a random convolutional layer of the CNN. The random layer may utilize random parameter sets for computations. The random layer may include matrices with learnable parameters, such as a matrix of mean values, a matrix of standard deviation values, a matrix of displacement values, and an "epsilon" matrix with non-learned parameters. The matrix of mean values may be initialized with random values. The epsilon matrix may be based on a normal distribution value and an arbitrary standard deviation value each time the computation for the layer is performed. The matrices may be used to generate a randomized kernel matrix for the random layer. Randomized distortion parameters may be obtained from the random layer. The output of the random layer may be fed to a deconvolution layer of the CNN, where the input images may be restored and superimposed with random distortions. One or more images with the superimposed random distortions may be obtained as an output of the deconvolution layer. The one or more images with the superimposed random distortions may be added to a training set of images to train a machine learning model. The machine learning model may be a support vector machine, a neural network, etc. Once trained, the machine learning model can be used to automatically recognize new images.

As described herein, random augmentation provides for random distortions at the output of a neural network every time the same image passes through augmentation system. Using the methods described herein, an unlimited number of randomly distorted training images can be derived from a single image. The random distortions may be imposed using random rules and/or random values. Each random distortion may be most closely approximated to real (e.g., natural) distortions. The random convolutional layer may be built into another neural network, an autoencoder, a variational autoencoder ("VAE"), etc. In an example, the random convolutional layer may be embedded within an AE (although it is not necessary to restrict it to an AE). The synthetic (e.g., simulated), augmented image dataset derived by the systems and methods described herein allows for inclusion of a vast number of different types of images in a training set of images, improving the quality, accuracy, and usefulness of training of a neural network. The image processing effectively improves image recognition quality. The image recognition quality produced by the systems and methods of the present disclosure allows significant improvement in the optical character recognition (OCR) accuracy over various common methods. Additionally, the random convolution layer can provide for better augmentation for large images, high resolution images, rare images, images containing hieroglyphs, CJK symbols, Arabic strings, or other complex symbols. However, the disclosure is not limited to these types of images, rather, is inclusive of any types of images.

Various aspects of the above referenced methods and systems are described in details herein below by way of examples, rather than by way of limitation.

FIG. 1 depicts a high-level component diagram of an illustrative system architecture 100, in accordance with one or more aspects of the present disclosure. System architecture 100 includes a computing device 110, a repository 120, and a server machine 150 connected to a network 130. Network 130 may be a public network (e.g., the Internet), a private network (e.g., a local area network (LAN) or wide area network (WAN)), or a combination thereof.

An image 140 may be used as an input image that is to be augmented. In one example, image 140 may be a digital image depicting a document 141. In another example, image 140 may be included within document 141. Document 141 may be a printed document, an electronic document, etc. Image 140 may include an item 142 representing, for example, a symbol, a face, a pattern, a large image, a high resolution image, a rare image, or any other type of image. The image 140 may include or be part of a document with one or more sentences each having one or more words that each has one or more characters. The one or more characters may include, but not be limited to, hieroglyphs, CJK symbols, Arabic strings, or other complex symbols.

The image 140 may be received in any suitable manner. For example, a digital copy of the image 140 may be received by scanning the document 141 or photographing the document 141. Additionally, in some instances a client device connected to a server via the network 130 may upload a digital copy of the image 140 to the server. In some instances, for a client device connected to a server via the network 130, the client device may download the image 140 from the server. The image 140 may depict a document or one or more of its parts. In an example, image 140 may depict document 141 in its entirety. In another example, image 140 may depict a portion of document 141. In yet another example, image 140 may depict multiple portions of document 141. Image 140 may include multiple images. Image 140 may comprise multiple items 142, multiple documents 141, etc. The image 140 may be used to produce additional images for training a set of machine learning models.

Server machine 150 may be a rackmount server, a router computer, a personal computer, a portable digital assistant, a mobile phone, a laptop computer, a tablet computer, a camera, a video camera, a netbook, a desktop computer, a media center, or any combination of the above. The server machine 150 may include a random augmentation engine 151. The set of machine learning models 114 may be trained using training images 116 that have been generated using the random augmentation engine 151. The random augmentation engine 151 may generate multiple training images 116 from a single image (e.g., image 140) and provide images 116 to train the set of machine learning models 114. The set of machine learning models 114 may be composed of, e.g., a single level of linear or non-linear operations (e.g., a support vector machine [SVM]) or may be a deep network, i.e., a machine learning model that is composed of multiple levels of non-linear operations. Examples of deep networks are neural networks including convolutional neural networks, recurrent neural networks with one or more hidden layers, and fully connected neural networks. For example, a neural network for OCR may be trained using the augmented dataset (e.g., images 116) produced by the random augmentation engine 151.

The set of machine learning models 114 may be trained using training data to be able to recognize contents of various images. Once the set of machine learning models 114 are trained, the set of machine learning models 114 can be provided to image recognition engine 112 for analysis of new images.

The repository 120 may be a persistent storage that is capable of storing image 140, item 142, and/or document 141, training images 116, as well as various data structures used by various components of system 100. Repository 120 may be hosted by one or more storage devices, such as main memory, magnetic or optical storage based disks, tapes or hard drives, NAS, SAN, and so forth. Although depicted as separate from the computing device 110 and server machine 150, in an implementation, the repository 120 may be part of the computing device 110 or server machine 150. In some implementations, repository 120 may be a network-attached file server, while in other embodiments content repository 120 may be some other type of persistent storage such as an object-oriented database, a relational database, and so forth, that may be hosted by a server machine or one or more different machines coupled to the via the network 130.

The computing device 110 may be used for performing image recognition. The computing device 110 may include an image recognition engine 112. Image recognition may include, but not be limited to character recognition, optical character recognition, pattern recognition, photo recognition, facial recognition, etc. The computing device 110 may be a desktop computer, a laptop computer, a smartphone, a tablet computer, a server, a scanner, or any suitable computing device capable of performing the techniques described herein.

The image recognition engine 112 may include instructions stored on one or more tangible, machine-readable media of the computing device 110 and executable by one or more processing devices of the computing device 110. In an implementation, the image recognition engine 112 may use a set of trained machine learning models 114 that are trained to recognize various images. The set of machine learning models 114 may be trained using a set of images 116. In some instances, the set of trained machine learning models 114 may be part of the image recognition engine 112 or may be accessed on another machine (e.g., server machine 150) by the image recognition engine 112. Based on the output of the set of trained machine learning models 114, the image recognition engine 112 may recognize objects in various images, such as content of documents including one or more words, sentences, logos, patterns, faces, etc.

Figure 2:
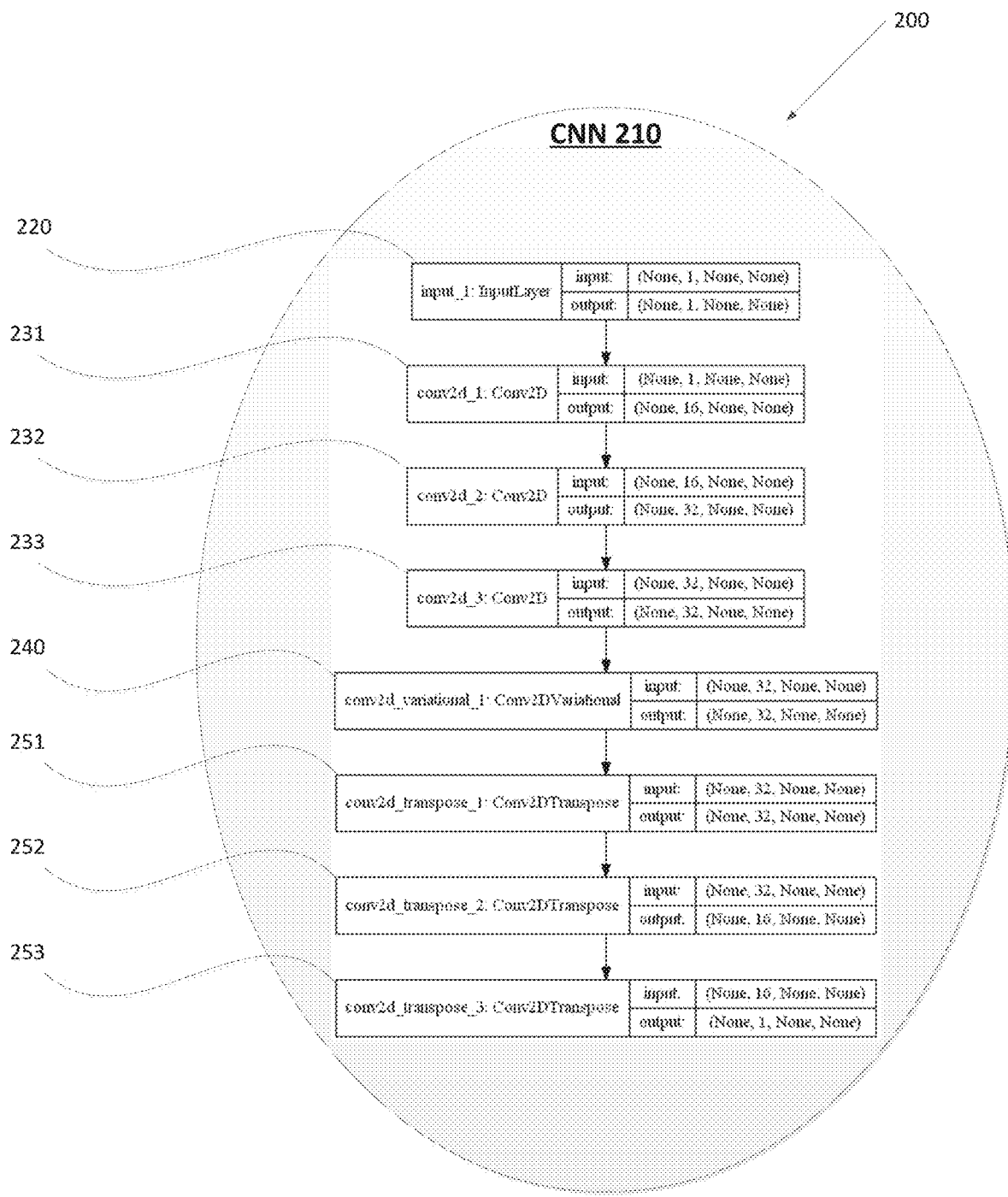
FIG. 2 illustrates an example augmentation system, in accordance with one or more aspects of the present disclosure.

FIG. 2 illustrates an example augmentation system 200 for augmentation of image data, in accordance with one or more aspects of the present disclosure. Augmentation system 200 may include random augmentation engine 151 as depicted in FIG. 1. Augmentation system 200 may be used to augment (e.g., increase, expand, etc.) the number of data points for use in a machine learning model. In one example, augmentation system 200 may be a neural network (NN), a Convolutional Neural Network (CNN) or part of a NN or a CNN. In another example, augmentation system 200 may be an autoencoder (AE), or part of an AE. In yet another example, augmentation system 200 may be a particular type of an AE, such as, a variational autoencoder (VAE), or part of a VAE. AEs and VAEs can reconstruct and restore a version of an input signal to the output. Augmentation system 200 may include a convolutional neural network (CNN) 210. Convolutional neural networks may consist of layers of computational units to hierarchically process visual data, and may feed forward the results of one layer to another layer, extracting a certain feature from input images. As depicted in FIG. 2, the example CNN 210 may include computational units 220, 231, 232, 233, 240, 251, 252, 253 ("computational units 220-253"). The computational units in CNN 210 may be arranged in layers. Each layer or set of layers may be designed to perform a particular type of function. For example, computational unit 220 may represent an input layer 220, computational units 231-233 may represent a first set of convolutional layers (e.g., layer 231, layer 232, layer 233), computational unit 240 may represent a second convolutional layer 240 (e.g., a random convolutional layer), computational units 251-253 may represent a third set of convolutional layers (e.g., layer 251, layer 252, layer 253), etc. Each of the layers may be sequentially arranged. An image received by CNN 210 as an input signal may be processed hierarchically, beginning with the first (e.g., input) layer, by each of the layers. CNN 210 may feed forward the output of one layer as an input to the next layer and produce a restored image as an overall output signal at the last layer (e.g., layer 253).

Figure 3:
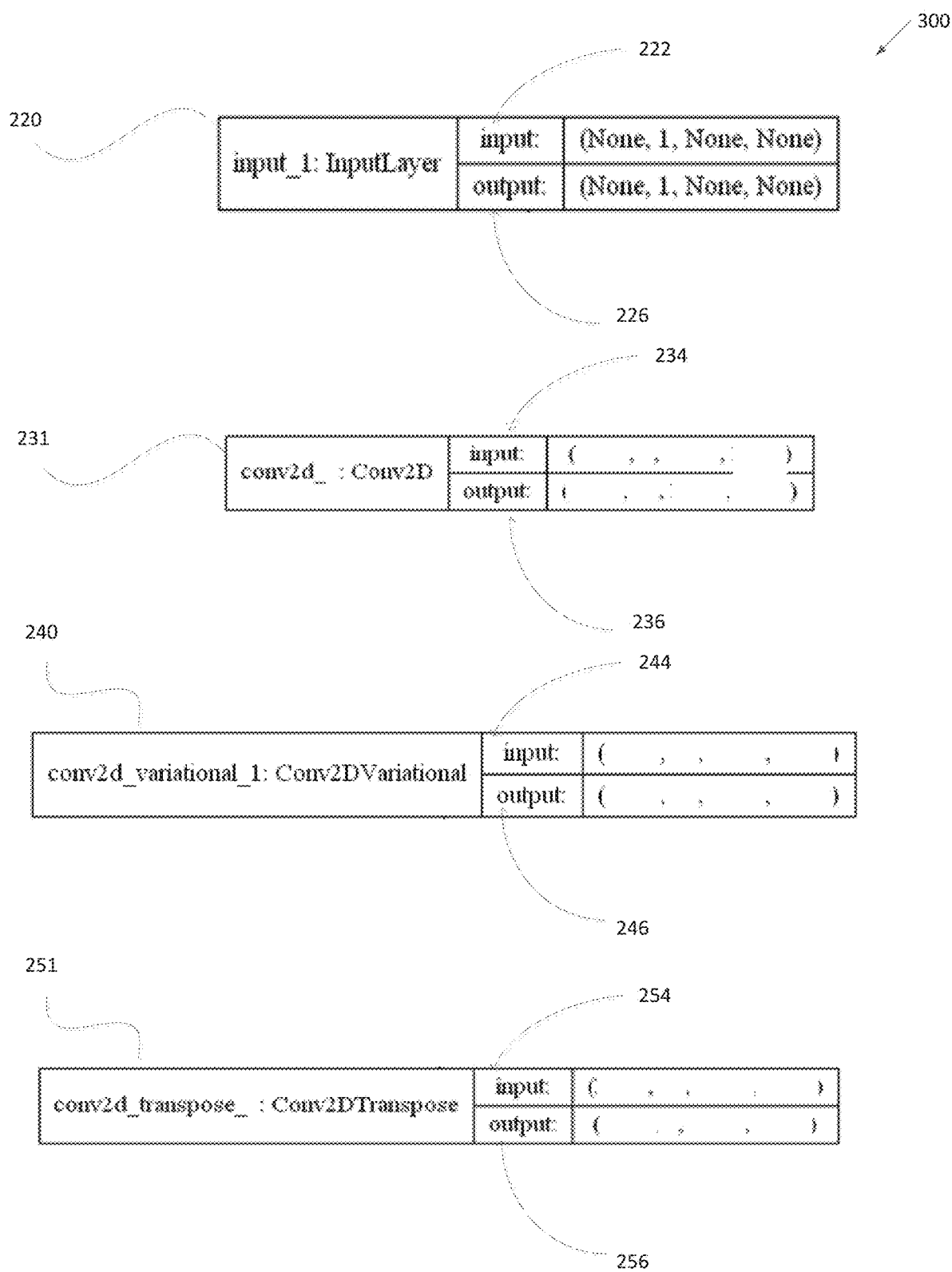
FIG. 3 depicts layers of computational units, in accordance with one or more aspects of the present disclosure.

FIG. 3 depicts various layers of computational units of a random augmentation system 300, in accordance with one or more aspects of the present disclosure. Random augmentation system 300 may be same or similar to augmentation system 200, and/or include or be part of random augmentation engine 151. Random augmentation system 300 may include a convolutional neural network, such as, CNN 210. The computational units of CNN 210 may accept one or more parameters as inputs for the various layers. The parameters may include, but not be limited to, image height, image width, size of filter, number of channels, number of filters, number of images, etc. The parameters may accept numeric values, characters, strings, etc. Some of the parameters may be optional. In an example, a value of "none" may be provided instead of a particular numeric value or a character. Values for some parameters may represent pixel values, such as, for image height or image width.

In one implementation, random augmentation system 300 may include input layer 220. Input layer 220 may be used to receive one or more images. The received one or more images may have arbitrary dimensions, such as, arbitrary height values, arbitrary width values, etc. The image may be of any size. The one or more images may include any type of an image. The one or more images may include, but not be limited to, an image of various sizes (e.g., small, medium, large), different resolution (e.g., high, low resolution), rare images, images containing symbols (e.g., hieroglyphs, CJK symbols, Arabic symbols), etc. An input layer may be used to pass on input values to the next layer of the CNN. In that regard, an input layer may receive an image signal in a particular format and pass on the same values as an output of the input layer to further layers. For example, the computational unit of input layer 220 may accept as input 222 one or more parameters, such as, number of images in a batch of images, number of channels, image height, image width, etc. Different images may be of different dimensions, without restriction. If multiple images are provided as input, each of the multiple images may be processed one at a time. In an implementation, input layer 220 may be designed to accept input 222 in the format "(number of images in a batch, number of channels, image height, image width)." An example of values for input 222 that are provided to input layer 220 is "(None, 1, None, None)," as depicted in FIG. 3. In an implementation, input layer 220 may be designed to produce an output 226 in the format "(number of images in a batch, number of channels, image height, image width)." An example of values of an output 226 produced by input layer 220 are "(None, 1, None, None)," as depicted in FIG. 3, which are the same as values of input 222. In an example, a channel may represent a color channel, such as, a greyscale image may have a single channel, an RGB (Red-Green-Blue) image may have 3 channels, one for red, one for green and one for blue. etc.

In an implementation, random augmentation system 300 may include various convolutional layers. The convolutional layers may be logically grouped. Convolutional layers may be used to perform filtering of an input image or representations of an input image in the increment of fragments of the input image. A fragment may be obtained by dividing an input image into a plurality of portions. Image filters used in the convolution layers may be represented as matrices or arrays of numbers. The numbers in the arrays (or matrices) may be referred to as weights or parameter sets. Applying a filter to a fragment of an input image may include calculating a dot product of the weights of a matrix and the pixel values of the fragment being processed. Each fragment may include multiple pixel values. Thus, the dot product calculation may be an element wise multiplication, that is, each pixel value of the fragment may be multiplied by the matrix weights. A "kernel" matrix (e.g., a small matrix) may be used to sum the results of the dot products for each fragment.

A kernel matrix may be the core of the convolution performed by each of the convolution layers.

In one implementation, random augmentation system 300 may include a first set of layers of computational units as a first set of convolutional layers 231, 232, 233. Each of the first set of convolutional layers may be two dimensional computational units. For example, the two dimensions may include height and width. The first set of convolutional layers may use particular image filters and channels. An image filter may remove components or features of an image signal. The first set of convolutional layers may be used to process a representation of an image. A representation of the image may be a processed version of an original image. FIG. 3 provides an example format of a layer 231 of the first set of convolutional layers 231-233. For example, the computational unit of convolutional layer 231 may accept as input 234 one or more parameters, such as, number of images in a batch of images, number of channels, image height, image width, etc. In an implementation, convolutional layer 231 (as well as layers 232 and 233) may be designed to accept input 234 in the format "(number of images in a batch, number of channels, image width, image height)." In an example, convolutional layer 231 may be designed to compute an output 236 as "(number of images in a batch, number of filters, image height divided by 2, image width divided by 2)." First set of convolutional layers 231-233 may be used to perform filtering of the image by fragments (e.g., a specified portion) of the image. Each of the first set of convolutional layers 231-233 may include, for each channel (e.g., red, green, blue color channels for an RGB image), a particular filter. Two matrices of learnable weights (or parameter sets) may be used for the first set of convolution layers. The learnable weights may include a kernel matrix and a bias matrix. The weights of the kernel matrix may be initially unknown and may be established during the learning process. Bias is determined by pixel-wise displacement applied to the result of the convolution. That is, the bias matrix may include unique scalar values that are added to the output of each layer's filter for each pixel to add a specified offset or displacement to the output values. Features of the bias matrix may include specified offset, its input and the output which is always equal to 1.

In one implementation, random augmentation system 300 may include a second layer of computational units as a second convolutional layer 240. The second convolution layer may also be known as a random convolutional layer or a variational convolutional layer. The random convolutional layer may be two dimensional computational unit. The random convolutional layer may further filter images using randomized parameters and produce random distortion parameters to modify the image. The distortion parameters obtained from the random layer may be superimposed on a representation of the image. FIG. 3 provides an example format of a random convolutional layer 240 (e.g., variational layer). For example, the computational unit of random layer 240 may accept as input 244 one or more parameters, such as, number of images in a batch of images, number of channels, image height, image width, etc. In an implementation, convolutional layer 231 (as well as layers 232 and 233) may be designed to accept input 234 in the format "(number of images in a batch, filters_in, image height, image width)." The parameter "Filters_in" may represent the number of channels at the input tensor. For example, a value for the parameter "Filters_in" may be 32 or another value. The value can vary according to the problem being solved. For example, the problem being solved may be dependent on the content of the input image. The values may be system modifiable elements that are chosen based on the type of input image. In an example, random layer 231 may be designed to compute an output 236 as "(number of images in a batch, filters_out, image height, image width)." The parameter "Filters_out" may represent the number of filters to apply at the input tensor. In an example, a tensor may be a mathematical object used to describe linear relationships between vectors, scalars, etc. For example, a value for the parameter "Filters_out" may be 32 or another value. The value can vary according to the problem being solved. Features of random convolutional layer 240 may be explained further with reference to FIG. 4.

In one implementation, random augmentation system 300 may include a third set of layers of computational units as a third set of convolutional layers 251, 252, 253. The third set of convolution layers may also be known as transposed convolutional layer or deconvolution layer. Each of the deconvolution layers may be two dimensional computational units. The deconvolution layers may use particular channels and sets of image filters to restore a representation of the image superimposed with distortion parameters. FIG. 3 provides an example format of a layer 251 of the deconvolutional layers 251-253. For example, the computational unit of deconvolutional layer 251 may accept as input 254 one or more parameters, such as, number of images in a batch of images, number of channels, image height, image width, etc. In an implementation, deconvolutional layer 251 (as well as layers 252 and 253) may be designed to accept input 254 in the format "(number of images in a batch, number of filters, image width, image height)." In an example, deconvolutional layer 251 may be designed to compute an output 256 as "(number of images in a batch, number of channels, image height multiplied by 2, image width multiplied by 2)."

Figure 4:
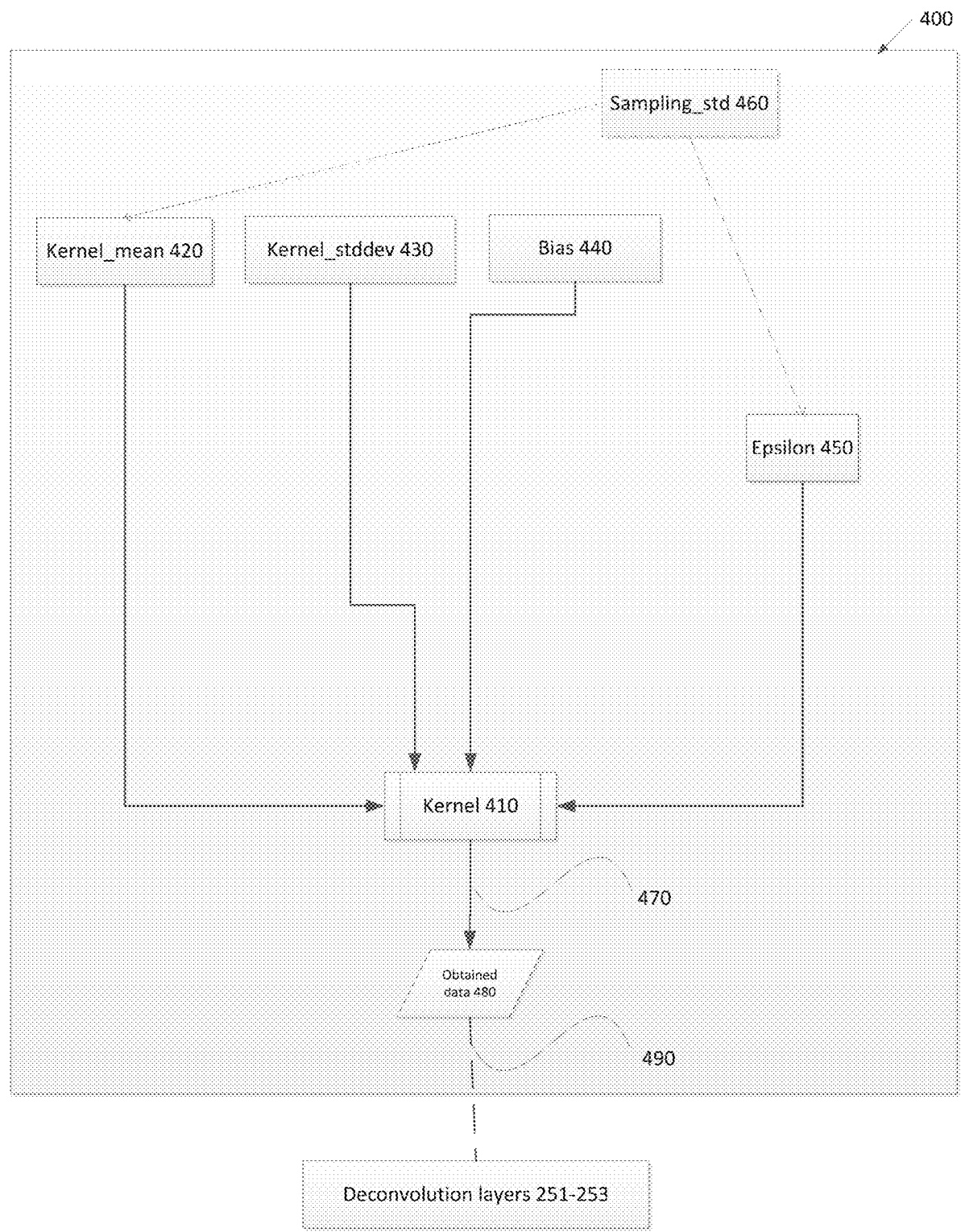
FIG. 4 illustrates features of an example random convolutional layer, in accordance with one or more aspects of the present disclosure.

FIG. 4 illustrates features of an example random convolutional layer 400, in accordance with one or more aspects of the present disclosure. Random convolutional layer 400 may be same or similar as random convolutional layer 240 of FIGS. 2 and 3. A representation of an input image may be modified with random distortion parameters produced by random convolutional layer 400. A randomized kernel matrix may be used for performing convolution at the random convolution layer. Performing convolution for the random layer may include applying filters to a representation of the input image. The filters may be applied in a similar manner as they are applied in the first set of convolutional layers 231-233, using one or more matrices and by performing similar computations. Dimension of the randomized kernel matrix may be similar to the dimension of the kernel matrix of the first set of convolution layers. However, the weights or parameter sets used for the one or more matrices for the random layer may be different, or be derived in a different manner than those of the first set of layers.

Calculation of the randomized kernel matrix of the random convolutional layer may involve selecting a sampling standard deviation value. For example, a parameter of the layer 400, sampling_std 460, may be used as the sampling standard deviation for random convolutional layer 400. The value of the sampling_std 460 may be selected arbitrarily, depending on the problem being solved. For example, values of the sampling_std 460 may include, but not be limited to, 0.1, 0.2, 0.3, 0.4, or other numeric values. In an implementation, augmenting an image using an autoencoder or other NN type, the sampling_std 460 parameter may specify "roughness" of distortions applied to the representation of the input image. The larger the selected value of the sampling_std 460, the coarser (e.g., grainier) the applied image distortion may be.

In an implementation, random convolutional layer 400 may include a kernel matrix 410, which may represent a randomized kernel matrix. The kernel matrix may be generated based on one or more matrices. For example, random convolutional layer 400 may be generated based on four matrices: 1) a kernel_mean matrix 420, 2) a kernel_stddev matrix 430, 3) a bias matrix 440, and 4) an epsilon matrix 450. The first three matrices 420, 430, and 440 may comprise of learnable weights or parameter sets. Kernel_mean matrix 420, kernel_stddev matrix 430, and epsilon matrix 450 may each be four dimensional matrices with parameters filter height, filter width, filters_in, and filters_out. Parameters filter height and filter width may represent the size of a filter. In an example, filter height may have a value of "3" (e.g., 3 pixels) and filter width may have a value of "3." The parameter filters_in may be the number of channels at the input of the matrix. The parameter filters_out may be the number of filters to apply to the input tensor. In an example, filters_in and filters_out may each have a value of "32" or a different value. The value of filters_height and/or filters_out may vary, according to the problem being solved.

In an example, kernel_mean matrix 420 may be a matrix of mean values. The kernel_mean matrix 420 may be initialized with random values. The kernel_mean matrix 420 may have same or similar shape as the kernel matrix of the first set of convolutional layers. The deviation between kernel matrix 410 and kernel_mean matrix 420 may be affected by the value of the selected sampling_std 460, as sampling_std 460 is used to calculate the standard deviation applied to the kernel_mean matrix 420 to derive kernel matrix 410. Kernel_mean matrix 420, kernel_stddev matrix 430, and epsilon matrix 450 may each have a shape similar to the kernel matrix of the first set of convolutional layers.

In an example, kernel_stddev matrix 430 may be a matrix of standard deviation values. The kernel_stddev matrix 430 may be initialized with zero values. The kernel_stddev matrix 430 may have same or similar shape as the kernel matrix of the first set of convolutional layers.

In an example, bias matrix 440 may be a matrix of displacement values. The bias matrix 440 may be generated based on a number of filters to apply to the input of the random layer. The bias matrix 440 may have same or similar role as the bias matrix of the first set of convolutional layers (e.g., applying pixel offset to the convolution results). The bias matrix 440 dimensions may be specified by the parameter filters_out. As described above, the parameter filters_out may be the number of filters to apply to the input of the matrix.

In an example, epsilon matrix 450 may be a matrix that is based on an arbitrary standard deviation value and a normal distribution value. The epsilon matrix may be a non-leaned matrix. The epsilon matrix 450 may be initialized with random values. The epsilon matrix may be generated anew with each pass of an input through the random layer. For example, a random number generator may be used to derive the epsilon matrix. Epsilon matrix 450 may be generated from a normal distribution with a mean value of zero and a standard deviation value of sampling_std 460. The shape of the epsilon matrix 450 may coincide with shape of the kernel_mean matrix 420.

The randomized kernel matrix of the random convolution layer may be generated based on the one or more matrices using a specified formula. For example, kernel matrix 410 may be calculated using the formula:

Kernel 410=Kernel_mean 420+exp(Kernel_*stddev*/2)×epsilon 450.

Thus, the weights or parameter sets generated for the kernel matrix 410 may be random each time and generated from the specific parameters of the normal distribution obtained in the learning process of the CNN. According to the formula, the randomized kernel matrix 410 may be a normal vector with a mean value of "kernel_mean 420" and the standard deviation value of "exp (Kernel_stddev/2)." Computation for the randomized kernel matrix may include arithmetic operations that are performed on a pixel by pixel basis. Determination of the distortion parameters may be performed for each portion (e.g., fragment) of the input image rather than determining an overall distortion parameter for the entirety of the input image as a whole. Each portion of the image may be processed separately within the CNN, resulting in local transformation of the input image for each portion. The convolution performed with generated randomized kernel matrix applied to the image data on the input of the random layer may represent random image distortion parameters superimposed to a representation of the input image.

Convolution operation 470 for the random convolution layer may be performed using the randomized kernel matrix 410, and obtained data 480 may be fed forward to deconvolutional layers 251-253 as output 490 of the convolution operation 470. Therefore, it may be possible to generate one or more randomly distorted images from a single input image each time a representation of the input image is passed through the random convolution layer after, as an example, AE which comprises this layer is learned and augment the image data set for the training set of images for a machine learning model.

Figure 5:
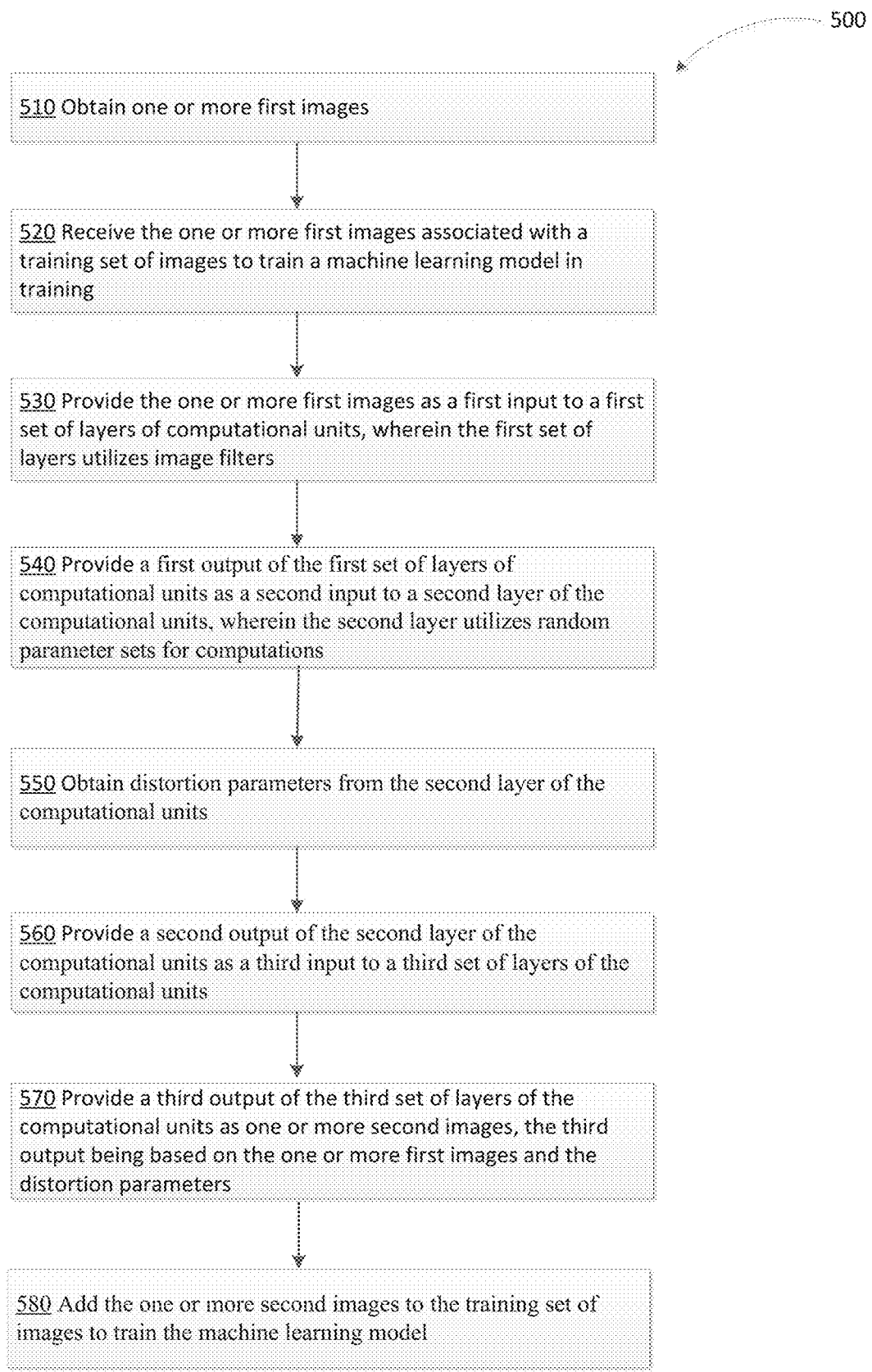
FIG. 5 depicts a flow diagram of one illustrative example of a method for generating augmentation of image data, in accordance with one or more aspects of the present disclosure.

FIG. 5 depicts a flow diagram of one illustrative example of a method 500 for generating augmentation of image data, in accordance with one or more aspects of the present disclosure. Method 500 and/or each of its individual functions, routines, subroutines, or operations may be performed by one or more processors of the computer system (e.g., example computer system 1100 of FIG. 11) executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. Therefore, while FIG. 5 and the associated description lists the operations of method 500 in certain order, various implementations of the method may perform at least some of the described operations in parallel and/or in arbitrary selected orders. In one implementation, the method 500 may be performed by the random augmentation engine 151 of FIG. 1.

Figure 6:
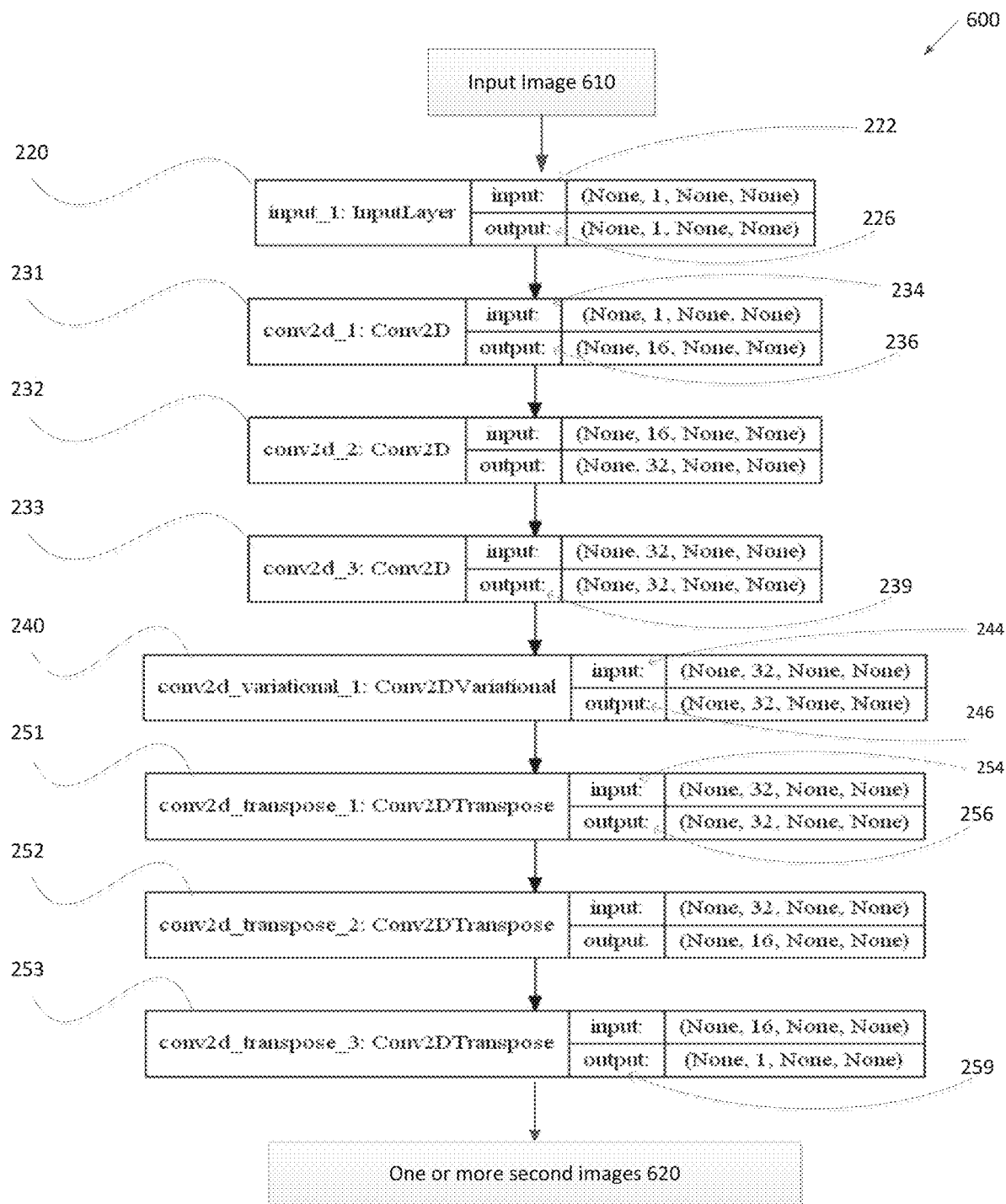
FIG. 6 illustrates an example of augmentation of images, in accordance with one or more aspects of the present disclosure.

At block 510, the computer system implementing the method 500 may obtain one or more first images used to train a set of machine learning models. The one or more first images may be used as an input image for which augmentation may be generated using method 500. Optionally, although not necessary, method 500 may pre-process the input image, including performing zooming, Sobel (e.g., Sobel-Feldman operation), Canny (e.g., Canny edge detection), morphological, and other image processing operations. For example, FIG. 6 illustrates obtaining an input image 610 as part of an augmentation system 600. Augmentation system 600 may be same or similar to the augmentation systems 200 and/or 300. FIG. 6 illustrates an example of interactions between the various components and layers of a random augmentation system and provides example values used for the components, in accordance to the present disclosure. The one or more first images may have arbitrary dimensions, such as, arbitrary height values, arbitrary width values, etc., and may be of any size. The one or more first images may include any type of an image. The one or more images may include, but not be limited to, an image of various sizes (e.g., small, medium, large), different resolution (e.g., high, low resolution), rare images, images containing symbols (e.g., hieroglyphs, CJK symbols, Arabic symbols or other known symbol types), etc.

At block 520, the computer system implementing method 500 may receive the one or more first images associated with a training set of images to train a machine learning model in training. The machine learning model may comprise a neural network, such as, a convolutional neural network (CNN). As illustrated in FIG. 6, input image 610 may be received by an input layer 220 of computational units 220-253. Following the format "(number of images in a batch, number of channels, image height, image width), an example of values for input 222 that are provided to input layer 220 is "(None, 1, None, None)." In the example, the value "1" may be the number of channels. Following the format "(number of images in a batch, number of channels, image height, image width)," an example of values of an output 226 produced by input layer 220 are "(None, 1, None, None)," which are the same as values of input 222, essentially passing the input image signal to the next layer of the CNN.

At block 530, the computer system may provide the one or more first images as a first input to a first set of layers of computational units. The first set of layers may utilize image filters as described in reference to FIG. 3. In an example, providing the first input to the first set of layers may include dividing the first image into a plurality of portions and providing each of the plurality of portions to the first set of layers of the computational units. As illustrated in FIG. 6, random augmentation system 600 may include a first set of layers of computational units as a set of first set of convolutional layers 231, 232, 233. The one or more first images (e.g., input image 610) may be provided as a first input 234 to a first set of layers 231-233. In particular, output 226 of input layer 220 may be provided as an input 234 to the first set of convolutional layer 231. Each of the first set of convolutional layers 231-233 may be used for iterative filtering and scaling of the one or more images (e.g., image 610). The iterative process may include passing on an output of one layer as an input to the next layer for further processing. An example of values for input 234 that are provided to first set of convolutional layer 231 are "(None, 1, None, None)," which is the same as the value of the output 226 of input layer 220. As per the format "(number of images in a batch, number of filters, image height divided by 2, image width divided by 2)," an example of values of an output 236 produced by input layer 231 are "(None, 16, None, None)." In the example, the value "16" may be the number of filters used as selected by the system for this layer. Following the iterative process, an output 239 may be generated at the last layer 233 of the first set of layers 231-233. An example of values for output 239 are "(None, 32, None, None)." In the example, the value "32" may be the number of filters used as selected by the system for this layer.

At block 540, the computer system may provide a first output of the first set of layers of computational units as a second input to a second layer of the computational units. The second layer may utilize random parameter sets for computations within the layer. Additionally, the computer system may generate a randomized kernel matrix for the second layer of the computational units based on one or more matrices. The one or more matrices may include one or more of: 1) a first matrix of mean values, the first matrix initialized with random values; 2) a second matrix of standard deviation values, the second matrix initialized with zero values; 3) a third matrix of displacement values, the third matrix based on a number of filters to apply to the second input; or 4) a fourth matrix (e.g., epsilon matrix) that is based on an arbitrary standard deviation value and a normal distribution value. In an example, the arbitrary standard deviation value specifies the roughness of the image distortions. Parameters for the one or more matrices may include at least one of filter height, filter width, image height, image width, size of filter, number of channels, number of filters, or number of images. The image height and image width each may include arbitrary values. In one example, the first matrix, the second matrix, and the third matrix each may include learnable parameters.

As illustrated in FIG. 6, random augmentation system 600 may include a second layer of computational units as a second convolutional layer (e.g., random layer) 240. A first output 239 of the first set of layers 231-233 may be provided as a second input 244 to a second layer 240. In particular, output 239 of the first set of convolutional layer 233 may be provided as an input 244 to the second layer (e.g., random layer) 240. Following the format "(number of images in a batch, filters_in, image height, image width)" for input to this layer, an example of values for input 244 that are provided to the random layer is "(None, 32, None, None)." In the example, the value "32" may be the "filters_in" or number of channels at the input tensor. The input 244 may be processed using the features of the random convolutional layer 240 (for example, as referred to in FIG. 4) and producing an output 246. Following the format "(number of images in a batch, filters_out, image height, image width)." An example of values for output 246 produced by random layer 240 is "(None, 32, None, None)." In the example, the value "32" may be the "filters_out" or number of filters to apply at the input tensor.

At block 550, the computer system may obtain distortion parameters from the second layer of the computational units. The distortion parameters obtained from the random layer may be superimposed on a representation of the input image 610 of FIG. 6. The computer system may obtain a distortion parameter for each of the plurality of portions of the first image. The convolution performed with generated randomized kernel matrix applied to the image data on the input of the random layer may represent random image distortion parameters superimposed to a representation of the input image.

At block 560, the computer system may provide a second output of the second layer of the computational units as a third input to a third set of layers of the computational units. In an example, the second layer may represent a deconvolution layer. As illustrated in FIG. 6, random augmentation system 600 may include a third set of layers of the computational units as a set of third set of convolutional layers 251, 252, 253. A second output 246 of the second layer 240 may be provided as a third input 254 to a third set of layers 251-253. In particular, output 246 of random layer 240 may be provided as an input 254 to the third set of convolutional layer 251. Following the format "(number of images in a batch, number of filters, image width, image height)," an example of values for input 254 that are provided to third set of convolutional layer 251 are "(None, 32, None, None)," which is the same as the value of the output 246 of the random layer 240. In the example, the value "32" may be the number of filters. As per the format "(number of images in a batch, number of channels, image height multiplied by 2, image width multiplied by 2)," an example of values of an output 256 produced by deconvolution layer 251 are "(None, 32, None, None)." In the example, the value "32" may be the number of channels. Each of the third set of convolutional layers 251-253 may be used for iterative filtering and scaling of input 254 to restore back a representation of the input image, passing the output of each of the third set of layers (e.g., deconvolution layers) as in input to the next deconvolution layer. Following the iterative process, an output 259 may be generated at the last layer 253 of the third set of layers 251-253. An example of values for output 259 are "(None, 1, None, None)." In the example, the value "1" may be the number of channels.

At block 570, the computer system may provide a third output of the third set of layers of the computational units as one or more second images, the third output being based on the one or more first images and the distortion parameters. As illustrated in FIG. 6, a third output 259 of the third set of layers 251-253 may be provided as one or more second images 620. The one or more second images 620 may include random distortions added to a representation (e.g., a processed version) of the first image (e.g., input image 610).

At block 580, the computer system may add the one or more second images to the training set of images to train the machine learning model. For example, one or more second images 620 (as depicted in FIG. 6) may be added to training images 116 (as depicted in FIG. 1).

Figure 7:
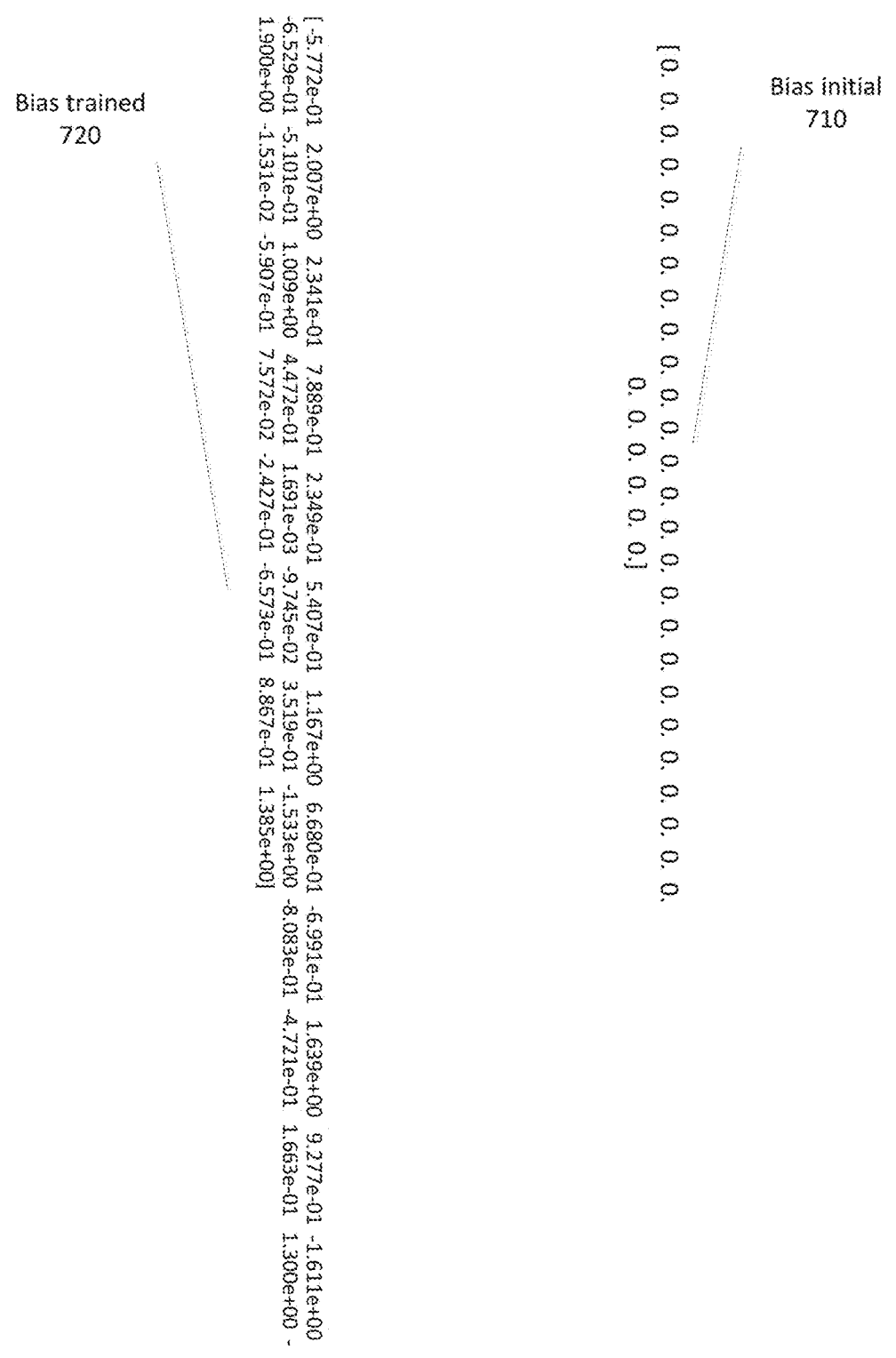

FIG. 7 illustrates an example of a bias matrix, in accordance with one or more aspects of the present disclosure. The bias initial value 710 shows that the initial bias values may be all zeros. After the bias values have gone through machine learning process, bias matrix may include different values. For example, bias trained value 720 shows that various non-zero numbers have replaced the initial zero values of the bias matrix.

Figure 8:
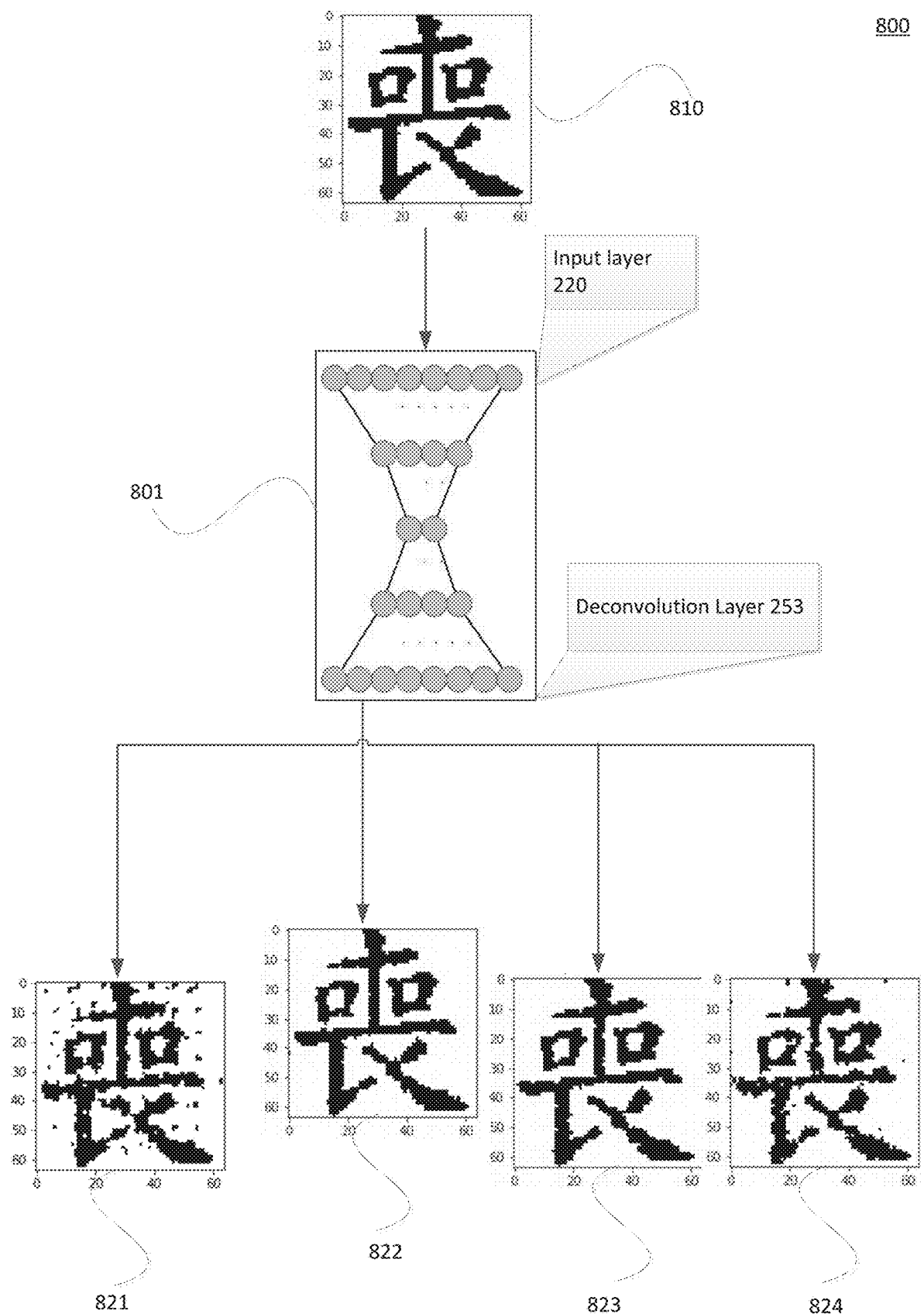
FIG. 8 illustrates an example of randomly distorting an image, in accordance with one or more aspects of the present disclosure.

FIG. 8 illustrates an example augmentation system 800 for randomly distorting an image, in accordance with one or more aspects of the present disclosure. Augmentation system 800 may be same or similar to augmentation system 200, 300, and/or 600. Augmentation system 800 may include an autoencoder 801 with layers of computational units. One of the computational units of autoencoder 801 may include a random convolution layer using a randomized kernel matrix. An input image 810 may be received by an input layer 220 of autoencoder 801. In the example, image 810 includes a CJK symbol. Convolution operation may be performed on input image 810, including using the randomized kernel matrix of the random convolution layer. As a result of the last convolution operation performed on a representation of input image 810 (e.g., processed version of input 810), deconvolution layer 253 may output one of the randomly distorted images 821, 822, 823, and 824. Images 821, 822, 823, and 824 may be modified version of input image 810 that have each been modified with a random distortion each time the input image 810 passed through autoencoder 801. Images 821, 822, 823, and 824 correspond to naturally distorted images of input 810 and are different from each other. Images 821, 822, 823, and 824 represent an augmented data set generated from a single input mage 810.

Images 821, 822, 823, and 824 may be added to a training set of images (e.g., training images 116 of FIG. 1) to train a machine learning model that can recognize a version of the input image 810.

In other implementations, 801 may be a neural network, a convolutional neural network, a variational autoencoder, etc.

Figure 9:
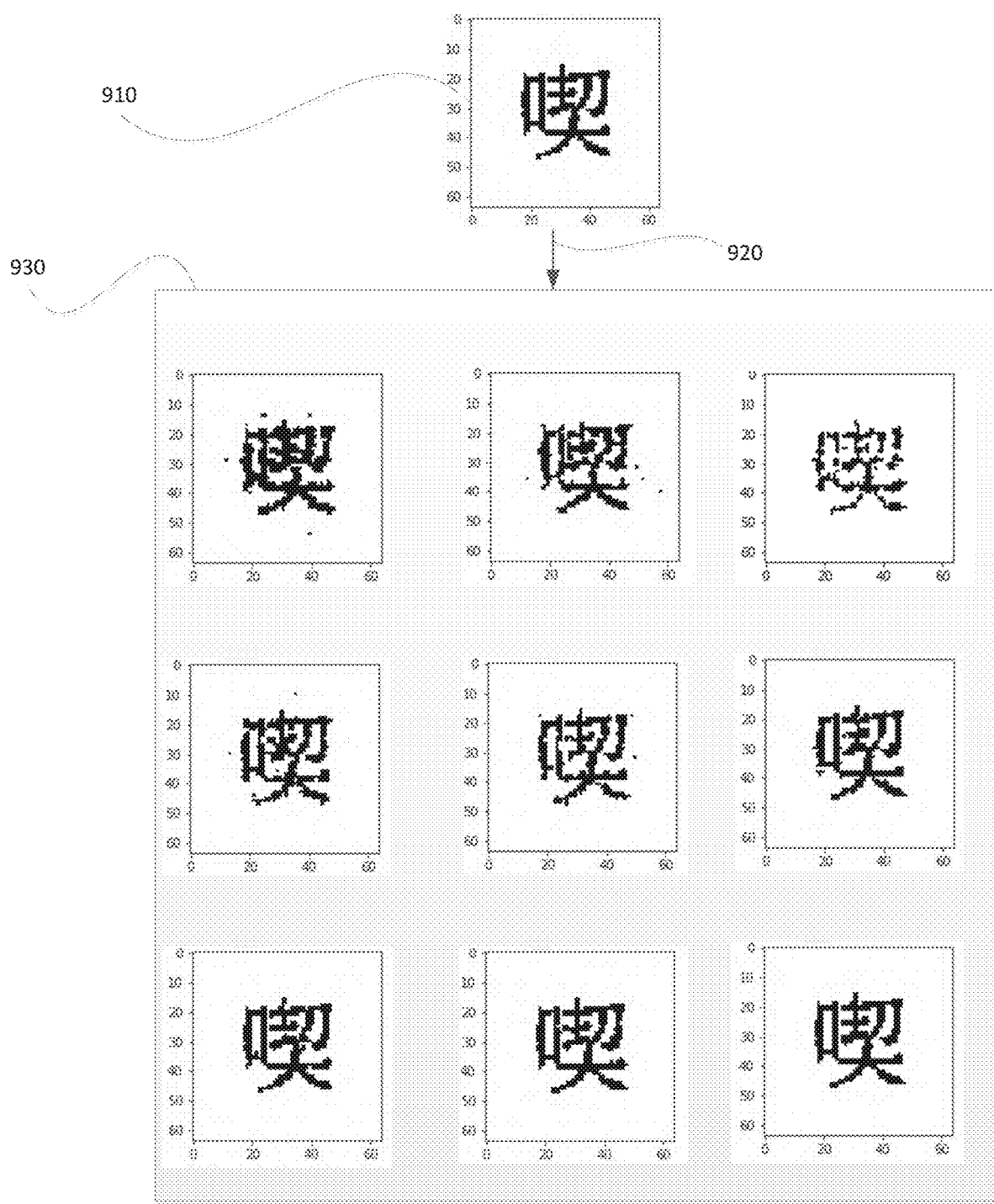
FIG. 9 illustrates an example of randomly distorted images of a CJK symbol, in accordance with one or more aspects of the present disclosure.
Figure 10:
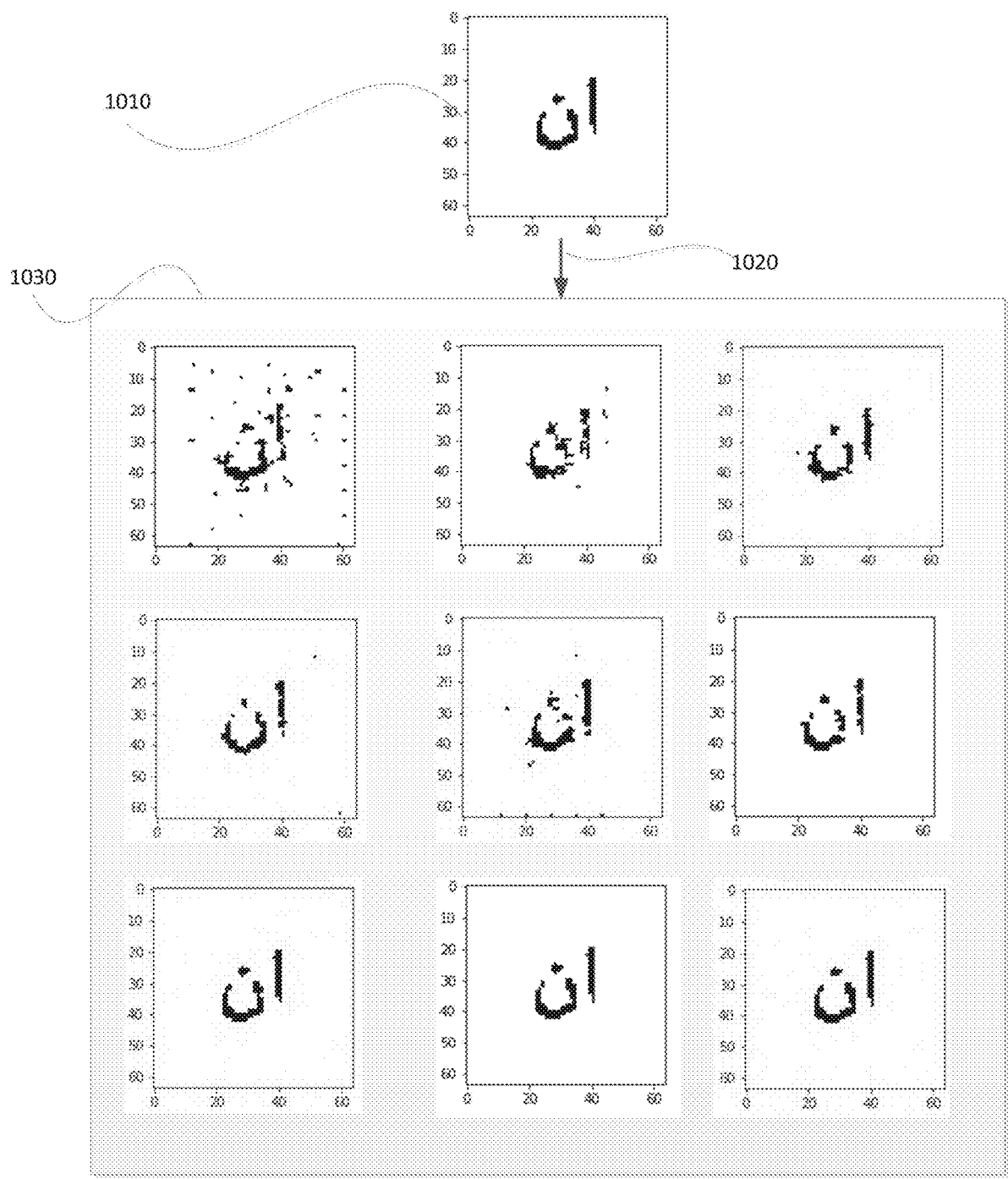
FIG. 10 illustrates another example of randomly distorted images of an Arabic symbol, in accordance with one or more aspects of the present disclosure.

FIGS. 9 and 10 illustrate examples of randomly distorted images, in accordance with one or more aspects of the present disclosure. FIG. 9 illustrates randomized augmentation of an input image 910. In the example, image 910 includes a CJK symbol. Input image 910 may be augmented using a randomized augmentation process 920 (e.g., using the random augmentation engine 151 of FIG. 1) to produce a set of output images 930. Output images 930 include nine different images that are randomly distorted versions of input image 910. As such, set of output images 930 represent an augmented data set generated from a single input mage 910. FIG. 10 illustrates randomized augmentation of an input image 1010. In the example, image 1010 includes an Arabic symbol. Input image 1010 may be augmented using a randomized augmentation process 1020 (e.g., using the random augmentation engine 151 of FIG. 1) to produce a set of output images 1030. Output images 1030 include nine different images that are randomly distorted versions of input image 1010. As such, set of output images 1030 represent an augmented data set generated from a single input mage 910.

Figure 11:
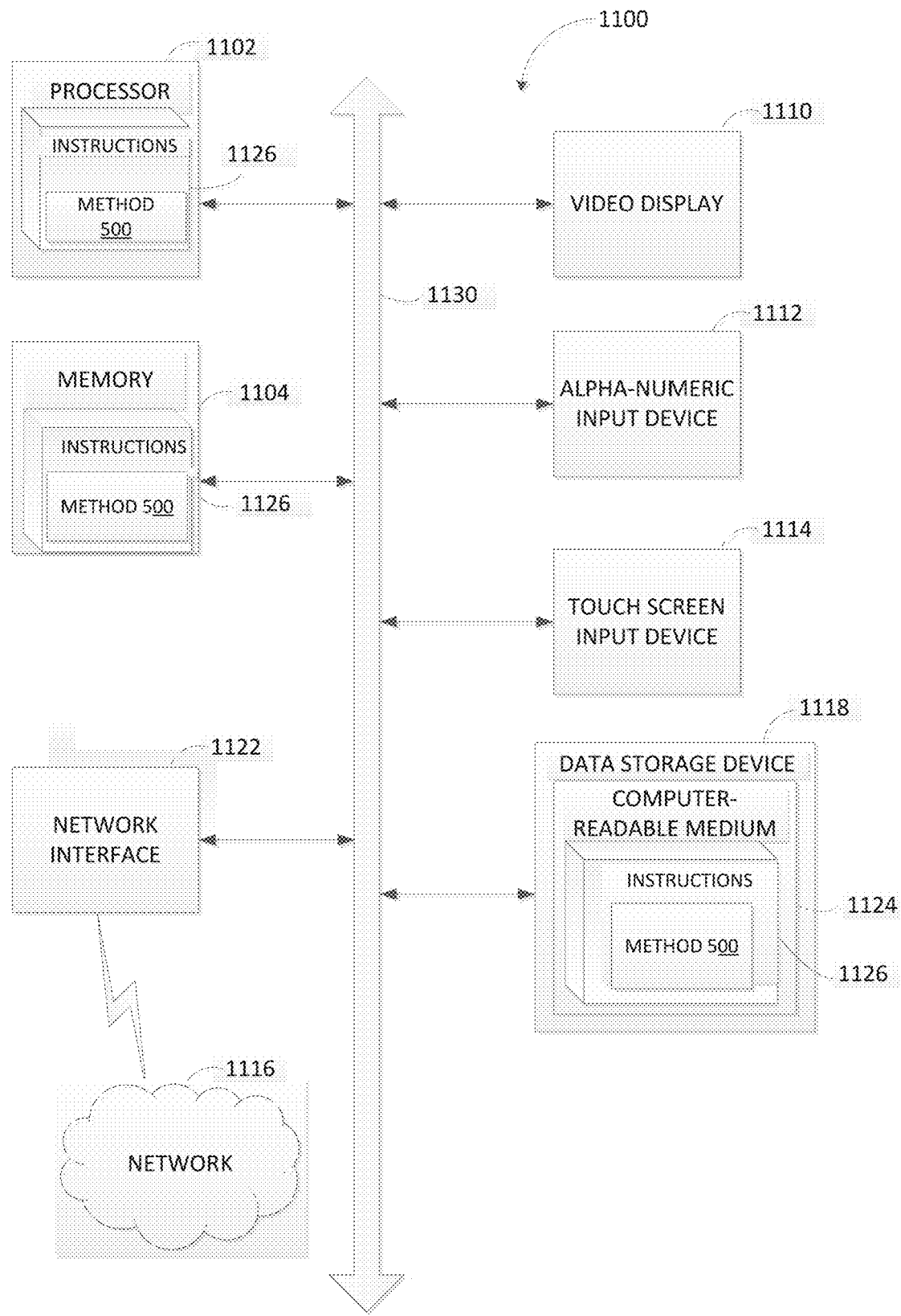
FIG. 11 depicts a component diagram of an example computer system which may execute instructions causing the computer system to perform any one or more of the methods discussed herein.

FIG. 11 depicts a component diagram of an example computer system which may execute instructions causing the computer system to perform any one or more of the methods discussed herein, may be executed. The computer system 1100 may be connected to other computer system in a LAN, an intranet, an extranet, or the Internet. The computer system 1100 may operate in the capacity of a server or a client computer system in client-server network environment, or as a peer computer system in a peer-to-peer (or distributed) network environment. The computer system 1100 may be a provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methodologies discussed herein.

Exemplary computer system 1100 includes a processor 1102, a main memory 1104 (e.g., read-only memory (ROM) or dynamic random access memory (DRAM)), and a data storage device 1118, which communicate with each other via a bus 1130.

Processor 1102 may be represented by one or more general-purpose processing devices such as a microprocessor, central processing unit, or the like. More particularly, processor 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 1102 may also be one or more special-purpose processing devices such as an application specific integrated circuit (ASIC), a field programmable gate array (FPGA), a digital signal processor (DSP), network processor, or the like. Processor 1102 is configured to execute instructions 1126 for performing the operations and functions of method 500 for generating image augmentation, as described herein above.

Computer system 1100 may further include a network interface device 1122, a video display unit 1110, a character input device 1112 (e.g., a keyboard), and a touch screen input device 1114.

Data storage device 1118 may include a computer-readable storage medium 1124 on which is stored one or more sets of instructions 1126 embodying any one or more of the methods or functions described herein. Instructions 1126 may also reside, completely or at least partially, within main memory 1104 and/or within processor 1102 during execution thereof by computer system 1100, main memory 1104 and processor 1102 also constituting computer-readable storage media. Instructions 1126 may further be transmitted or received over network 1116 via network interface device 1122.

In certain implementations, instructions 1126 may include instructions of method 500 for generating image augmentation, as described herein above. While computer-readable storage medium 1124 is shown in the example of FIG. 11 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "computing," "calculating," "obtaining," "identifying," "modifying," "generating" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving, by a processing device, one or more first images associated with a training set of images to train a machine learning model in training;
providing, by the processing device, the one or more first images as a first input to a first set of layers of computational units, wherein the first set of layers utilizes image filters;
providing a first output of the first set of layers of computational units as a second input to a second layer of the computational units, wherein the second layer utilizes random parameter sets for computations;
obtaining distortion parameters from the second layer of the computational units;
generating one or more second images based on the one or more first images and the distortion parameters;
obtaining, as a third output, the one or more second images; and
adding the one or more second images to the training set of images to train the machine learning model.

2. The method of claim 1, further comprising:
providing a second output of the second layer of the computational units as a third input to a third set of layers of the computational units.

3. The method of claim 1, wherein the machine learning model comprises a convolutional neural network.

4. The method of claim 1, wherein providing the first input comprises:
dividing the one or more first images into a plurality of portions; and providing each of the plurality of portions to the first set of layers of the computational units.

5. The method of claim 4, wherein obtaining the distortion parameters comprises:
obtaining a distortion parameter for each of the plurality of portions of the one or more first images.

6. The method of claim 1, further comprising:
generating a randomized kernel matrix for the second layer of the computational units based on one or more matrices.

7. The method of claim 6, wherein the one or more matrices comprise one or more of:
a first matrix of mean values, the first matrix initialized with random values;
a second matrix of standard deviation values, the second matrix initialized with zero values;
a third matrix of displacement values, the third matrix based on a number of filters to apply to the second input; or
a fourth matrix that is based on an arbitrary standard deviation value and a normal distribution value.

8. The method of claim 7, wherein the arbitrary standard deviation value specifies a roughness of image distortions.

9. The method of claim 6, wherein parameters for the one or more matrices comprise at least one of filter height, filter width, image height, image width, size of filter, number of channels, number of filters, or number of images.

10. The method of claim 9, wherein the image height and image width each comprises arbitrary values.

11. The method of claim 1, wherein the one or more first images comprise one or more of:
one or more hieroglyphs;
one or more Chinese-Japanese-Korean (CJK) symbols;
one or more Arabic strings; or
a combination of one or more other symbols.

12. The method of claim 1, wherein generating the one or more second images comprises:
generating the one or more second images corresponding to naturally distorted images.

13. The method of claim 1, wherein generating the one or more second images further comprises performing convolution prior to obtaining the one or more second images as the third output.

14. The method of claim 7, wherein the first matrix, the second matrix, and the third matrix each comprises learnable parameters.

15. A system comprising:
a memory; and
a processor, coupled to the memory, the processor to:
receive one or more first images associated with a training set of images to train a machine learning model in training;
provide the one or more first images as a first input to a first set of layers of computational units, wherein the first set of layers utilizes image filters;
provide a first output of the first set of layers of computational units as a second input to a second layer of the computational units, wherein the second layer utilizes random parameter sets for computations;
obtain distortion parameters from the second layer of the computational units;

provide a second output of the second layer of the computational units as a third input to a third set of layers of the computational units;
provide a third output of the third set of layers of the computational units as one or more second images, the third output being based on the one or more first images and the distortion parameters; and
add the one or more second images to the training set of images to train the machine learning model.

16. The system of claim 15, wherein the processor is further to:
generate a randomized kernel matrix for the second layer of the computational units based on one or more matrices.

17. The system of claim 16, wherein the one or more matrices comprise one or more of:
a first matrix of mean values, the first matrix initialized with random values;
a second matrix of standard deviation values, the second matrix initialized with zero values;
a third matrix of displacement values, the third matrix based on a number of filters to apply to the second input; or
a fourth matrix that is based on an arbitrary standard deviation value and a normal distribution value.

18. The system of claim 17, wherein the arbitrary standard deviation value specifies roughness of image distortions.

19. A computer-readable non-transitory storage medium comprising executable instructions that, when executed by a processing device, cause the processing device to:
receive one or more first images associated with a training set of images to train a machine learning model in training;
provide the one or more first images as a first input to a first set of layers of computational units, wherein the first set of layers utilizes image filters;
provide a first output of the first set of layers of computational units as a second input to a second layer of the computational units, wherein the second layer utilizes random parameter sets for computations;
obtain distortion parameters from the second layer of the computational units;
generate one or more second images comprising a representation of the one or more first images modified with the distortion parameters;
obtain, as a third output, the one or more second images; and
add the one or more second images to the training set of images to train the machine learning model.

20. The computer-readable non-transitory storage medium of claim 19, wherein to provide the first input, the processing device is to:
divide the one or more first images into a plurality of portions; and
provide each of the plurality of portions to the first set of layers of the computational units.

* * * * *